United States Patent
Griffin, II et al.

(10) Patent No.: US 12,501,191 B2
(45) Date of Patent: Dec. 16, 2025

(54) SYSTEMS WITH HIDDEN OPENINGS

(71) Applicant: Apple Inc., Cupertino, CA (US)

(72) Inventors: James G. Griffin, II, Redwood City, CA (US); Lukas Satas, Santa Clara, CA (US); Michael S. Nashner, San Jose, CA (US); Zuguang Chen, Milpitas, CA (US); Jason T. Parker, San Francisco, CA (US)

( * ) Notice: Subject to any disclaimer, the term of this patent is extended or adjusted under 35 U.S.C. 154(b) by 173 days.

(21) Appl. No.: 18/476,203

(22) Filed: Sep. 27, 2023

(65) Prior Publication Data

US 2024/0022842 A1 Jan. 18, 2024

Related U.S. Application Data

(63) Continuation of application No. 17/391,555, filed on Aug. 2, 2021, now Pat. No. 11,838,709.

(60) Provisional application No. 63/082,770, filed on Sep. 24, 2020.

(51) Int. Cl.
| | |
|---|---|
| *H04R 1/02* | (2006.01) |
| *B60N 2/56* | (2006.01) |
| *B60N 2/70* | (2006.01) |
| *B60N 2/879* | (2018.01) |
| *B60Q 3/233* | (2017.01) |
| *H04R 1/32* | (2006.01) |

(52) U.S. Cl.
CPC ........... *H04R 1/023* (2013.01); *B60N 2/5642* (2013.01); *B60N 2/70* (2013.01); *B60N 2/879* (2018.02); *B60Q 3/233* (2017.02)

(58) Field of Classification Search
CPC .... H04R 1/023; H04R 2420/07; H04R 1/028; B60R 11/0217; B60R 13/02
See application file for complete search history.

(56) References Cited

U.S. PATENT DOCUMENTS

| | | |
|---|---|---|
| 6,637,709 B1 | 10/2003 | Guenther et al. |
| 7,334,362 B2 | 2/2008 | Bladt |
| 7,677,660 B2 | 3/2010 | Galbreath et al. |
| 7,880,131 B2 | 2/2011 | Andre et al. |
| 8,081,430 B2 | 12/2011 | Weber et al. |
| 8,388,057 B2 | 3/2013 | Barkow et al. |
| 8,690,410 B2 | 4/2014 | Pance et al. |
| 9,275,810 B2 | 3/2016 | Pance et al. |
| 9,710,017 B2 | 7/2017 | McClure et al. |
| 10,474,193 B2 | 11/2019 | McClure et al. |
| 10,474,417 B2 | 11/2019 | Wang et al. |
| 10,582,284 B2 | 3/2020 | Trainer et al. |

(Continued)

*Primary Examiner* — Shin H Kim
(74) *Attorney, Agent, or Firm* — Treyz Law Group, P.C.; G. Victor Treyz; David K. Cole

(57) ABSTRACT

A system such as a vehicle, building, vessel, aircraft, or electronic device system may have a layer of material with invisible laser-drilled openings. The layer of material may include an outer layer of fabric overlapping an inner layer such as an inner foam layer. Laser-drilled openings may include outer openings in the fabric layer and inner openings in the foam layer. Each of the inner openings may be overlapped by multiple outer openings. The exposed surface of the fabric layer may have strands of material of different appearances and/or may otherwise be configured to help visually hide the laser-drilled openings. Laser-drilled openings may also have small sizes to help make the laser-drilled openings invisible. Laser-drilled openings may overlap components such as audio components, heating and cooling components, and/or light-emitting components.

20 Claims, 12 Drawing Sheets

(56) References Cited

U.S. PATENT DOCUMENTS

| | | |
|---|---|---|
| 11,032,647 B2 | 6/2021 | Weiß et al. |
| 11,159,869 B2 | 10/2021 | Grinker et al. |
| 2005/0218710 A1 | 10/2005 | Browne et al. |
| 2006/0087165 A1 | 4/2006 | Gharabegian |
| 2007/0133949 A1 | 6/2007 | Tatsuta et al. |
| 2007/0257537 A1 | 11/2007 | Asbury |
| 2008/0024470 A1 | 1/2008 | Andre et al. |
| 2008/0084404 A1 | 4/2008 | Andre et al. |
| 2009/0040790 A1 | 2/2009 | Payne |
| 2009/0066127 A1 | 3/2009 | Galbreath et al. |
| 2009/0322124 A1 | 12/2009 | Barkow et al. |
| 2010/0156156 A1 | 6/2010 | Smith |
| 2012/0299358 A1 | 11/2012 | Herbst |
| 2015/0201507 A1 | 7/2015 | Chang |
| 2016/0128484 A1 | 5/2016 | Gross et al. |
| 2018/0272644 A1 | 9/2018 | Hamada et al. |
| 2019/0026056 A1 | 1/2019 | Wang et al. |
| 2019/0035567 A1 | 1/2019 | O'Keeffe |
| 2019/0313172 A1 | 10/2019 | Sunshine et al. |
| 2020/0107101 A1 | 4/2020 | Grinker et al. |
| 2020/0139814 A1 | 5/2020 | Galan Garcia et al. |
| 2021/0211796 A1 | 7/2021 | McIntosh et al. |
| 2021/0229128 A1 | 7/2021 | Smith et al. |
| 2021/0235174 A1 | 7/2021 | Audi et al. |
| 2022/0002951 A1 | 1/2022 | Vandecruys |
| 2022/0007095 A1 | 1/2022 | Sunshine et al. |
| 2022/0196495 A1 | 6/2022 | Ogasawara et al. |

SYSTEMS WITH HIDDEN OPENINGS

This application is a continuation of U.S. patent application Ser. No. 17/391,555, filed Aug. 2, 2021, which claims the benefit of provisional patent application No. 63/082,770, filed Sep. 24, 2020, which are hereby incorporated by reference herein in their entireties.

FIELD

This relates generally to structures with openings and, more particularly, to structures with openings that overlap components.

BACKGROUND

Systems such as vehicles and other systems have electronic components and components that handle tasks such as heating and cooling. In a vehicle interior, these components may be overlapped by layers of material such as cloth, polymer, or leather.

SUMMARY

A system such as a vehicle, building, or electronic device system may have a layer of material with invisible openings. The layer of material may form a covering for part of a vehicle seat such as a seat cushion, backrest, or headrest or may form other suitable covering structures.

The invisible openings may be laser-drilled openings. The layer of material may include an outer layer of fabric overlapping an inner layer such as an inner foam layer. The laser-drilled openings may have an outer openings in the fabric layer and inner openings in the foam layer. Each of the inner openings may be overlapped by multiple outer openings. The exposed surface of the fabric layer may have strands of material of different appearances and/or may otherwise be configured to help visually hide the laser-drilled openings. Laser-drilled openings may also have small sizes to help make the laser-drilled openings invisible.

Laser-drilled openings may overlap components such as audio components, heating and cooling components and/or light-emitting components. During operation of the system, sound, air, and/or light may pass through the openings.

DETAILED DESCRIPTION

A system may have components. The components may be electrical components such as microphones, speakers or other audio components, electrical components such as displays and other components that emit light, heating and/or cooling system components that cool and/or heat the system, and/or other components. To help hide these components from view by a user of the system, the components may be covered with a layer of material. The layer of material may include one or more sublayers. Openings in the layer may be used to allow signals to pass through the layer (e.g., sound and/or light) and/or openings in the layer may be used to allow air to flow through the layer (e.g., to support heating and/or cooling operations). The layer of material and the openings in the layer of material may be configured to help visually hide the presence of the openings. For example, openings may be formed in the layer so as to ensure that airflow ports, acoustic ports, and/or light-transmitting window areas formed form the openings are invisible to the unaided eye of a user.

Systems that may be provided with layers of material having openings may include buildings, vehicles, vessels (e.g., ships, boats, yachts, or other watercraft), aircraft (e.g., planes or helicopters), electronic devices systems (e.g., portable electronic devices such as cellular telephones, tablet computers, removable covers for cellular telephones and tablet computers, etc.), and other suitable systems. Illustrative configurations in which systems such as vehicles are provided with layers having openings may sometimes be described herein as an example. This is merely illustrative. Layers with openings may be formed in any suitable systems.

Figure 1:
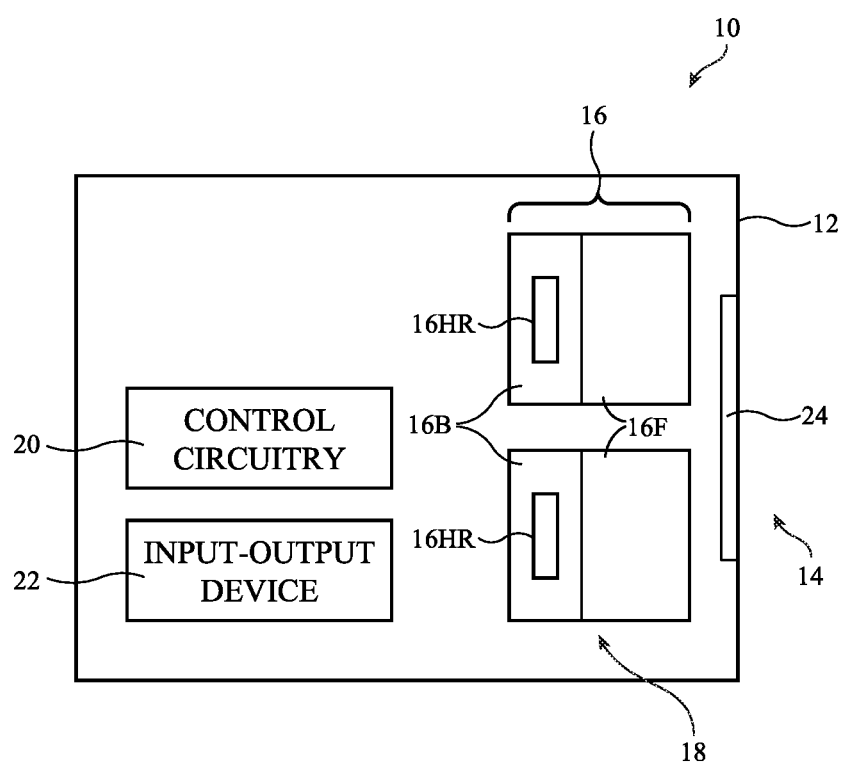
FIG. 1 is a schematic diagram of an illustrative system in accordance with an embodiment.

An illustrative system of the type that may include a layer with openings is shown in FIG. 1. As shown in FIG. 1, system 10 may have a support structure such as support structure 12 that supports one or more windows such as window 24 (e.g., a vehicle window). Support structure 12 and window 24 separate interior region 18 from exterior region 14.

Structure 12 may form walls of a building, a vehicle body, a vessel body, an aircraft body, an electronic device housing or other supporting structures. In arrangements in which structure 12 forms a vehicle body, structure 12 may include a chassis to which wheels, propulsion systems, steering systems, and other vehicle systems are mounted and may include doors, trunk structures, a hood, side body panels, a roof, and/or other body structures. If desired, seats 16 may be formed in interior region 18. Seats 16 may include a driver's side seat and one or more passenger seats. Each seat may have a seat cushion 16F, a backrest 16B, and a headrest 16HR (as an example).

System 10 may include control circuitry 20 and input-output devices 22. Input-output devices 22 may include sensors (e.g., touch sensors, a microphone, buttons, etc.), may include audio components such as speakers and microphones, may include light-emitting components such as lamps, light-emitting diodes, lasers, and other light-emitting devices, light-emitting diode displays and other displays, and/or other light-emitting components, and may include other components for providing output to an occupant of system 10, for making measurements of the environment surrounding system 10, and for gathering input from an occupant of system 10. If desired, system 10 may include heating and cooling components such as fans, heating systems, air conditioning systems, and other heating and/or cooling devices.

Control circuitry 20 may include storage and processing circuitry such as volatile and non-volatile memory, microprocessors, application-specific integrated circuits, digital signal processors, microcontroller, and other circuitry for controlling the operation of system 10. In scenarios in which system 10 is a vehicle, control circuitry 20 may control the components of the vehicle based on user input and other input from input-output device 22 (e.g., to adjust the vehicle's steering, brakes, throttle, and other controls associated with driving the vehicle and/or to adjust the operation of one or more components that in system 10 (e.g., components that are overlapped by a layer with openings, etc.). If desired, system 10 may be an autonomously driven vehicle.

Figure 2:
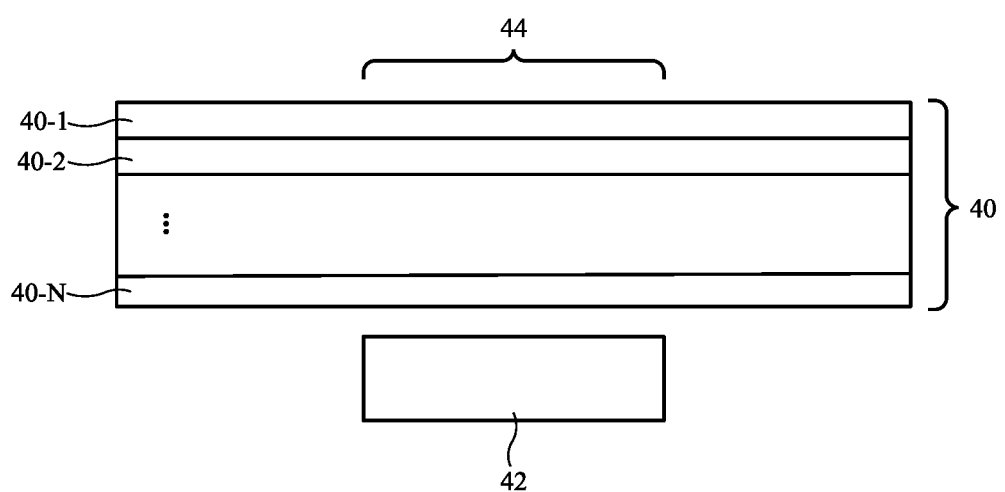
FIG. 2 is a cross-sectional side view of a component overlapped by an illustrative layer that may be provided with openings in accordance with an embodiment.

FIG. 2 is a cross-sectional side view of an illustrative layer of the type that may be provided with openings overlapping a component in system 10. As shown in FIG. 2, layer 40 may have one or more sublayers such as layers 40-1, 40-2, . . . 40-N. These sublayers may include layers of material such as polymer (e.g. solid sheets of rigid and/or flexible polymer, polymer foam, elastomeric polymer materials such as silicone, polymer adhesive, etc.), metal, fiberglass and other fiber composite materials, textiles such as woven fabric, knit fabric, braided items, and/or other fabric, glass, ceramic, cotton, leather, wood, and other natural materials, ceramic, glass, other materials, and/or combinations of these materials. Illustrative configurations in which layer 40 includes a soft layer such as a layer of foam (e.g., inner layer may sometimes be described herein as an example. Inclusion of a soft layer of material into layer 40 may help provide layer 40 with a soft feel to the touch and thereby provide comfort for a user who is touching layer 40. Layer 40 may be incorporated into seats 16 (FIG. 1), footwell structures, headliner structures, dashboard structures, doors, and/or other walls or other layers exposed to interior 18 of system 10 (as examples). In an illustrative configuration, which may sometimes be described herein as an example, layer 40 may be incorporated into the headrests or cushions of seat 16.

System 10 (e.g., seats 16, and/or other structures in system 10) may include components such as system component 42. System component 42 may be, for example, mounted inside a seat or other portion of system 10. Layer 40 may form a covering layer. At least some of layer in area 44 overlapping system component 42 may be provided with openings that pass completely through layer 40 or partly through layer 40. Component 42 may include one or more input-output devices 22, heating and/or cooling system components, control circuitry 20, electrical components, optical components, audio components, and/or other component(s). By incorporating openings in some or all of an area such as area 44 of layer 40 that overlaps component 42, component 42 can operate through layer 40 while remaining hidden behind layer 40.

The openings in layer 40 may be configured to be invisible to a user (e.g., an occupant of system 10 such as a vehicle occupant). By configuring layer 40 so that the openings in area 44 are not visually discernable to the unaided eye, the presence of the openings does not create an undesirably unsightly appearance for layer 40 (e.g., portions of seat 16 such as headrest 16HR may have an attractive appearance that is unmarred by visible openings).

Illustrative configurations in which different types of system component 42 are located under layer 40 are shown in FIGS. 3, 4, 5, and 6.

Figure 3:
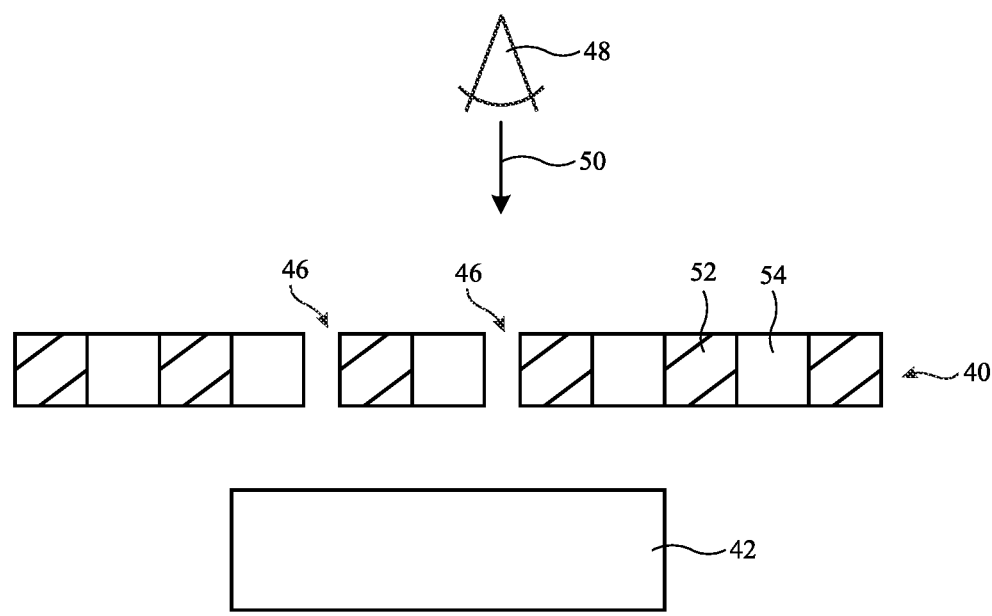
FIG. 3 is a cross-sectional side view of an illustrative layer with openings overlapping a component that causes air to flow through the openings in accordance with an embodiment.

In the example of FIG. 3, component 42 is a component that heats, cools, and/or causes air to flow (e.g. a fan, an air conditioning unit, a heater, etc.). As show in FIG. 3, openings 46 may pass through layer 40 in alignment with component 42. During operation, hot and/or cold air associated with component 42 may pass through openings 46. For example, if component 42 is a fan, the fan may cause air to pass inwardly or outwardly through openings 46 to cool a seat or other structure that incorporates layer 40. To help prevent openings 46 from creating an undesired appearance to the surface of layer 40, openings 46 may be relatively small and/or layer may be provided with visual features that help hide openings 46 from view. A user such as viewer 48 who is viewing the surface of layer 40 in direction 50 may, as an example, be unable to visually detect the presence of openings 46 in layer 40 (e.g., openings 46 may be invisible to the naked eye by virtue of the small size of openings 46 and/or the presence of visually distracting features such as areas of different appearance on the surface of layer 40. These areas of different appearance may include, for example, areas such as areas 52 and areas such as areas 54. Areas 52 and 54 may have different appearances (e.g., different colors, different textures, etc.). Due to the presence of areas of different appearance such as areas 52 and 54, particularly in scenarios in which the sizes of areas 52 and 54 is comparable to that of openings 46 (e.g., within a factor of 1-10), openings 46 may be invisible to the user.

Openings 46 may have circular footprints (outlines when viewed from above) or may have other shapes (e., openings 46 may be rectangular, etc.). Openings 46 may all have the same size or different openings 46 may have different sizes. In an illustrative configuration, openings 46 have the same size (within +/−25% or other suitable tolerance) and have diameters D1, whereas areas 52 and 54 have lateral dimensions D2 that are 2-6 times the size of diameter D1, that are 0.5-2 times the size of diameter D1, that are 0.2-5 times the size of diameter D1, that are 1-10 times the size of diameter D1, that are at least 5 times the size of diameter D1, that are less than 25 times the size of diameter D1 and/or that have other suitable sizes relative to the size of diameter D1. The value of diameter D1 (or other lateral dimension associated with the size of openings 46) may be less than 0.5 mm, less than 0.4 mm, less than 0.3 mm, less than 0.2 mm, less than 0.1 mm, at least 0.05 mm, or other suitable size.

Figure 4:
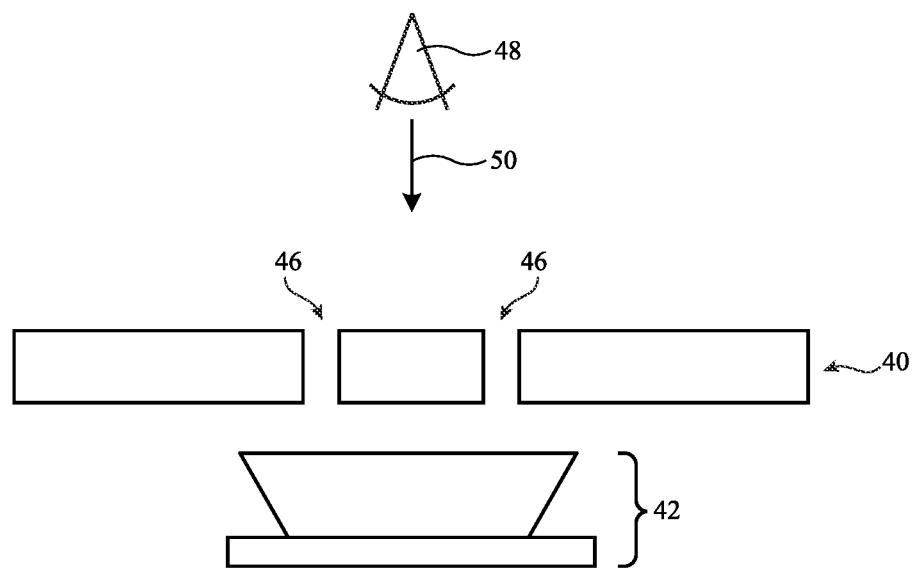
FIG. 4 is a cross-sectional side view of an illustrative layer with openings overlapping an audio component in accordance with an embodiment.

In the illustrative configuration of FIG. 4, component 42 is an audio component (e.g., a speaker that emits sound that passes through openings 46 and/or a microphone that detects sound that passes through openings 46).

Figure 5:
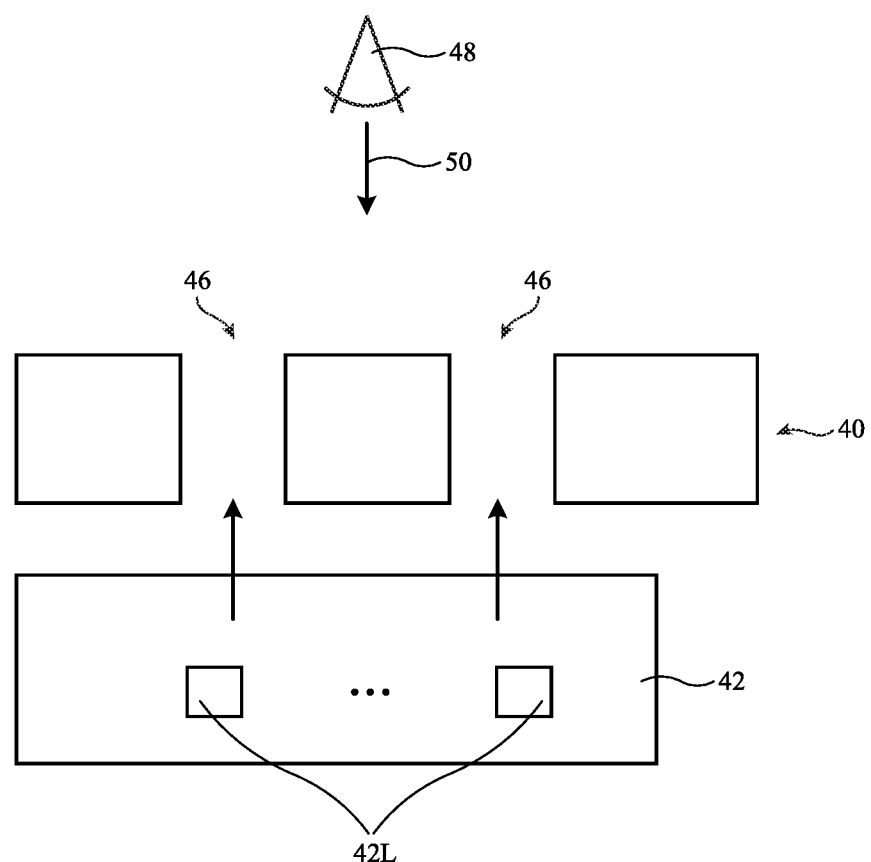
FIG. 5 is a cross-sectional side view of an illustrative layer with openings overlapping a light-emitting component in accordance with an embodiment.

FIG. 5 is a cross-sectional side view of layer 40 in an illustrative configuration in which component 42 is an optical component that emits or detects light. Component 42 may be, for example, a light-emitting component that includes multiple light-emitting devices 42L. Devices 42L may be crystalline semiconductor light-emitting diode dies, may be thin-film organic light-emitting diodes, may be laser diodes, and/or may be other components that emit light. Devices 42L may emit light through a light guide plate or other light distribution structure, may be located under a diffuser layer, may be aligned with lenses or other components that spread light laterally before the light passes through openings 46 in layer 40, may emit light through a stencil or other patterned layer (e.g., an ink layer with openings that define desired shapes for icons, etc.), and/or may be small pixel-sized light-emitting devices that are arranged to form a pixel array that can display text, graphics, and/or other visual content (e.g., images). The pitch (pixel-center-to-pixel-center spacing) of pixel-sized devices 42L may be selected, as an example, to create a display with at least 50 pixels per inch, at least 150 pixels per inch, less than 400 pixels per inch, or other suitable display resolution). A display formed from devices 42L may have at least 1000 or at least 10,000 pixels (as examples). When used as a status indicator (e.g., a power indicator or other light-emitting component that emits light to convey operating status) or other light-emitting component where image-quality resolution is not needed, there may be relatively fewer devices 42L (e.g., fewer than 25, fewer than 10, etc.).

Figure 6:
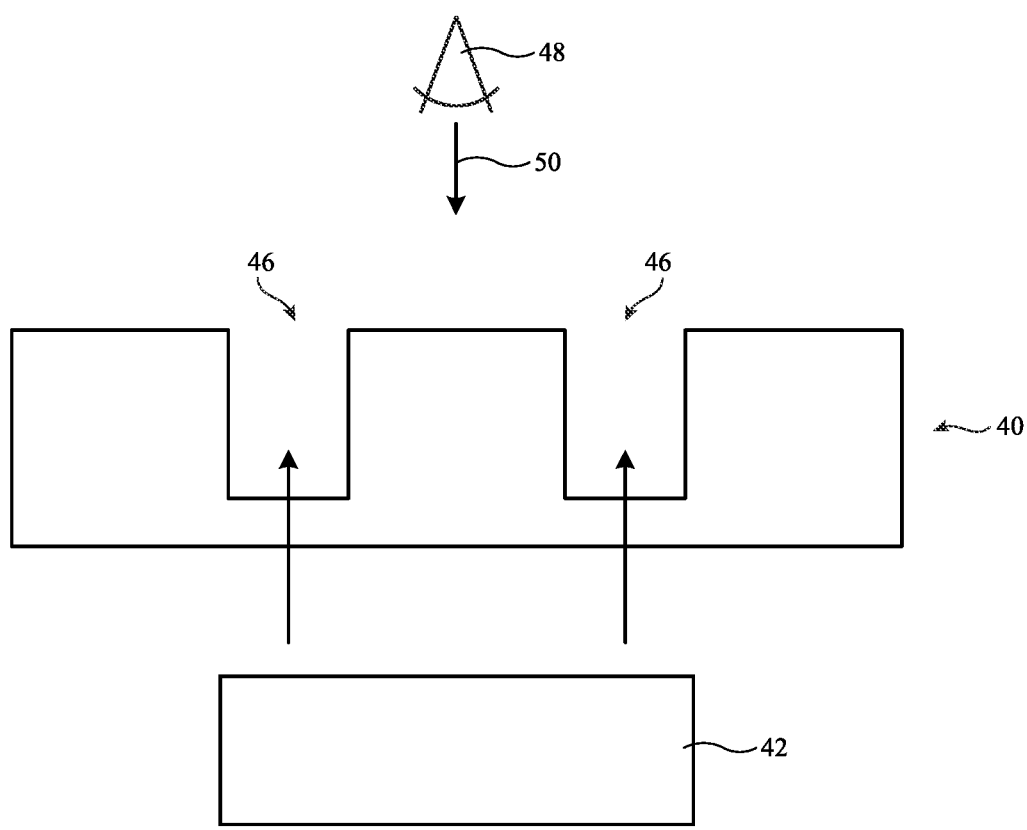
FIG. 6 is a cross-sectional side view of an illustrative layer with openings that pass only partly through the layer and that overlaps a light-emitting component in accordance with an embodiment.

In the example of FIG. 5, openings 46 are through holes that pass entirely through layer 40. If desired, openings 46 for optical components such as component 42 of FIG. 5 may pass only partway through layer 40 as shown in FIG. 6. The presence of partial openings such as openings 46 in layer 40 may allow light to selectively pass to or from component 42 through openings 46 while being blocked by thicker surrounding portions of layer 40 (e.g., the thinned portion of layer 40 that remains for each opening may be sufficiently thin to transmit light that is visible to a user). Although openings 46 of FIGS. 5 and 6 are able to pass light, openings 46 of FIGS. 5 and 6 are preferably not directly visible to the user because, as described in connection with FIG. 3, the diameters of openings 46 and the optional presence of areas of differing appearance such as areas 52 and 54 that create a pattern on the surface of layer 40 make openings 46 invisible.

If desired, openings 46 may pass through multiple sublayers of material. Each sublayer may have openings and the openings of each sublayer may be aligned with each other to form openings 46. Openings in different sublayers may be the same size and shape or may have different sizes and shapes.

Figure 7:
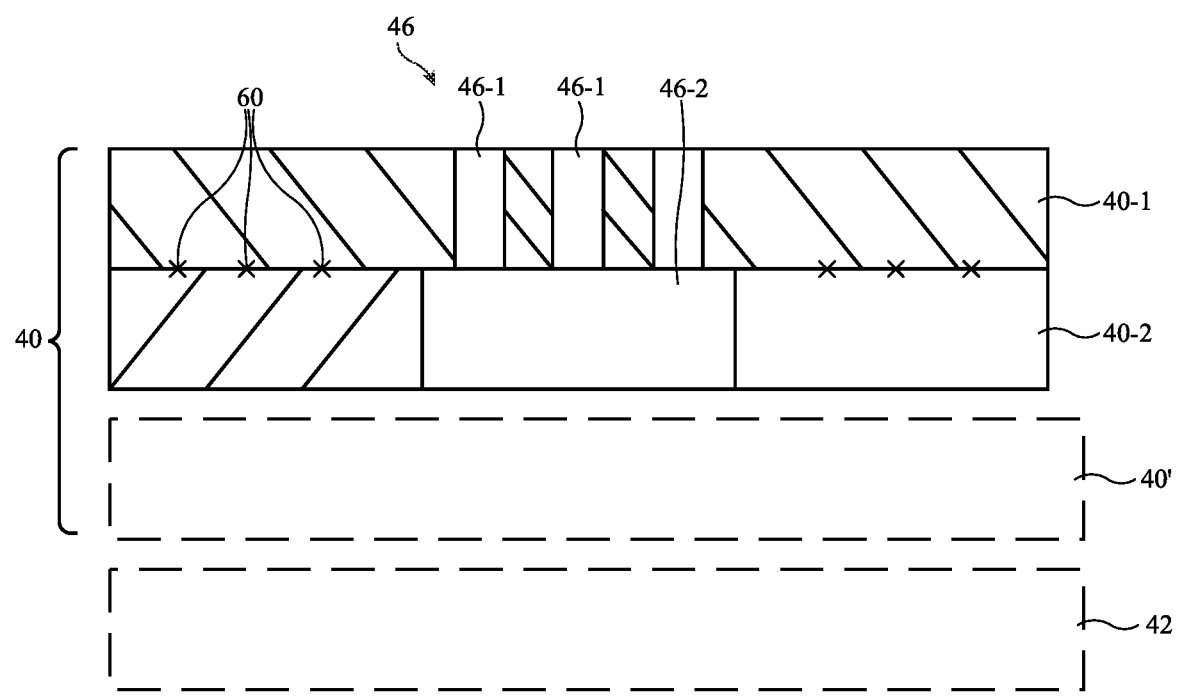
FIG. 7 is a cross-sectional side view of an illustrative layer with sublayers having overlapping openings in accordance with an embodiment.

Consider, as an example, the cross-sectional side view of illustrative layer 40 of FIG. 7. In this example, openings 46 are formed in layer 40, which overlaps component 42. Component 42 may, as an example, be located in the interior of a vehicle headrest or other vehicle seating structure and layer 40 may form a cover layer for the vehicle headrest or other vehicle seating structure.

As shown in FIG. 7, layer 40 may include an outermost (top) layer such as layer 40-1, a second-to-outermost layer such as layer 40-2 and optional additional sublayer(s) such as layer Layer 40-1 may be a layer of fabric, a layer of polymer, or other layer of material. Layer may be a layer of polymer foam (open cell and/or closed cell foam), may be an elastomeric material, may be a soft layer of fabric, or may be any other suitable layer of material. Layer 40-1 may have openings that are configured to avoid visual detection such as openings 46-1. These openings may be made invisible to viewers using small opening dimensions and/or by configuring layer 40-1 to exhibit a visually distracting surface pattern (e.g., fabric strands of different colors, printed patterns, surface texture, etc.). Layer 40-1 may be attached to layer 40-2 using adhesive 60.

To ensure that sound, air, and/or light may pass through openings 46, openings 46-1 are aligned with corresponding openings 46-2 in layer 40-2. The size of openings 46-2 may be larger or smaller than the size of openings 46-1 or may be the same size as openings 46-1. In the example of FIG. 7, openings 46-2 are larger than openings 46-1. This may facilitate alignment between openings 46-1 and 46-2 when attaching layer 40-1 to layer 40-2. In an illustrative configuration, the diameters of openings 46-2 may be 1-10 mm, 3 mm, at least 1.5 mm, at least 2 mm, less than 7 mm, less than 5 mm, less than 4 mm, less than 2 mm, or other suitable size. The smaller diameters of openings 46-1 (which establish the opening sizes for openings 46) may be less than 0.5 mm, less than 0.4 mm, less than 0.3 mm, less than 0.2 mm, less than 0.1 mm, at least 0.05 mm, or other suitable size.

Optional inner layers in layer 40 such as optional layer 40' may have openings that overlap openings 46-2 so that openings 46 are not blocked. The sizes of the openings in additional layers such as layer 40' may, as an example, be larger than the sizes of openings 46-2.

Figure 8:
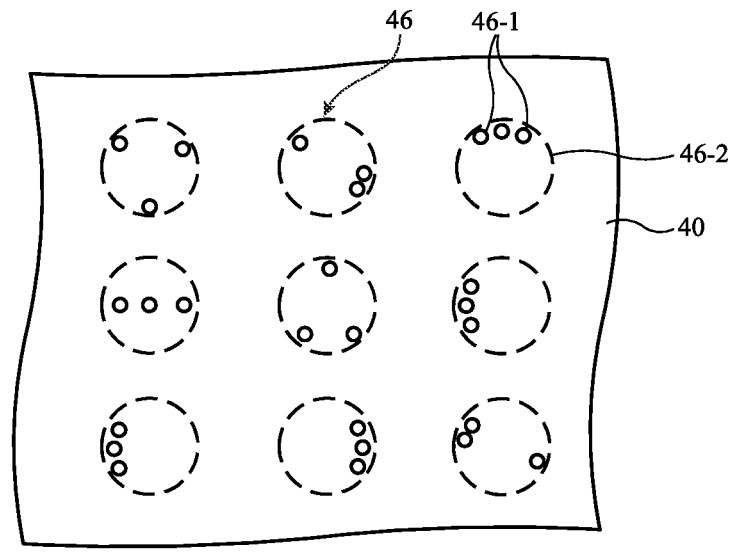
FIGS. 8 and 9 are top views of illustrative layers with openings in accordance with an embodiment.
Figure 9:
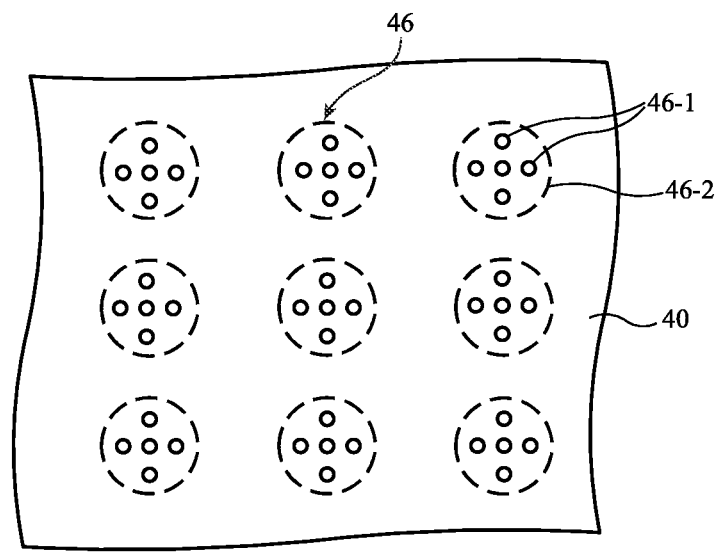

There may be any suitable number of openings 46-1 per opening 46-2 (e.g., at least 1, at least 2, at least 3, at least 4, 3-10, 2-10, fewer than 25, fewer than 6, etc.). In the illustrative top view of layer 40 in FIG. 8, there are three openings 46-1 per opening 46-2 and openings 46-1 are positioned randomly across the surface of layer 40 to help reduce the visibility of openings 46. In the example of FIG. 9, there are five openings 46-1 per opening 46-2 and openings 46-1 are organized more regularly (e.g., to form cross-shaped patterns of openings 46-1 within each opening 46-2). The use of regular opening patterns such as the pattern of openings 46-1 overlapping openings 46-2 in FIG. 9 may help enhance the fraction of the surface area of layer 40 that is occupied by openings 46 (e.g., the FIG. 9 arrangement may allow for a potentially larger number of openings 46-1 per unit area), thereby enhancing the efficiency of openings 46 in passing air, sound, and/or light.

The region of layer 40 that contains openings 46 may cover all of layer 40 or a part of layer 40 that overlaps component 42. Because air, sound, and/or light may pass through openings 46 in the area overlapping component 42, this area of layer 40 may sometimes be referred to as forming a port or window in layer 40 (e.g. a ventilation port, audio port, or optical window). The port (or window) in this type of configuration contains openings 46, whereas remaining portions of layer 40 that do not overlap component 42 need not contain openings 46. Nevertheless, to help visually hide the port or window formed from openings 46 over component 42, the region containing openings 46 may be extended beyond the borders of component 42. If desired, the density of openings 46 just beyond the borders of components 42 may be decreased as a function of increasing distance from the port or window that overlaps component 42. This may help hide the presence of the port or window.

Figure 10:
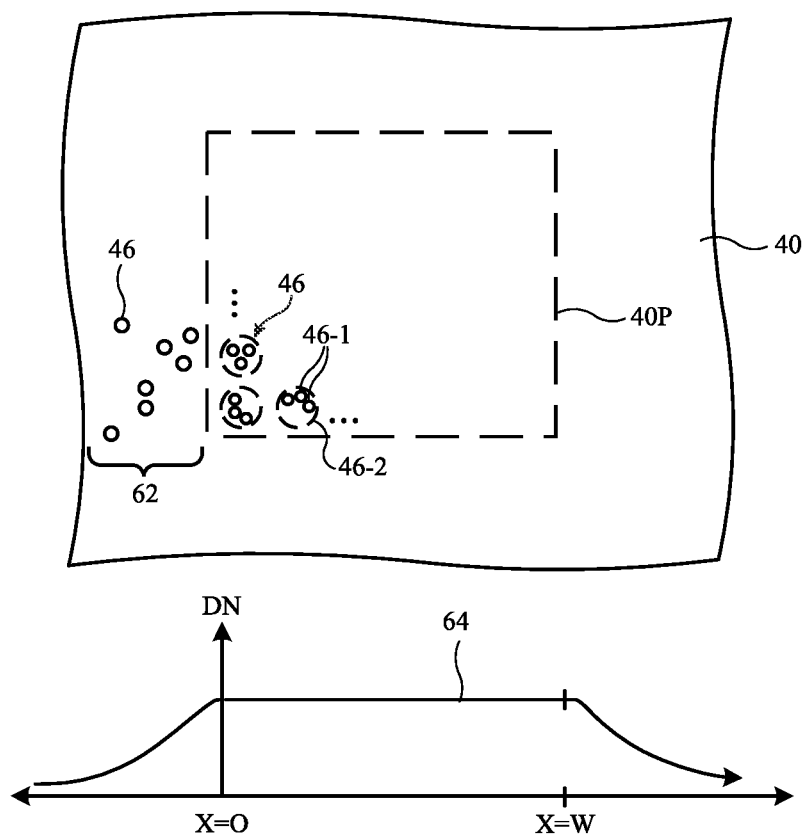
FIG. 10 is a diagram showing how opening density may be varied laterally across the surface of an illustrative layer to help ensure that openings are invisible in accordance with an embodiment.

Consider, as an example, the illustrative arrangement of the port or window formed from area 40P of FIG. 10, which overlaps an underlying component 42. In area 42P, openings 46-1 in layer 40-1 overlap corresponding larger openings 46-2 in layer 40-2, thereby forming openings 46. The positions of openings 46 within area 40P may be randomized (e.g., dithered slightly) about a regular grid pattern of locations, thereby helping to visually hide openings 46 in area 40P

Curve 64 of the graph of FIG. 10 shows how there may be a constant density (openings per unit area) DN of openings 46 between the left edge (X=0) and opposing right edge (X=W) of area 40P. Abruptly terminating the presence of openings 46 at the edges of area 40P creates a risk that the edges of area 40P will be visible. Accordingly, in the example of FIG. 10, additional openings 46 are formed outside of area 40P (e.g., in surrounding areas such as area 62). As shown by curve 64, the density DN of openings 46 may be decreased smoothly and gradually at increasing distances from area 40P to make the location of the edges of area 40P invisible.

Figure 11:
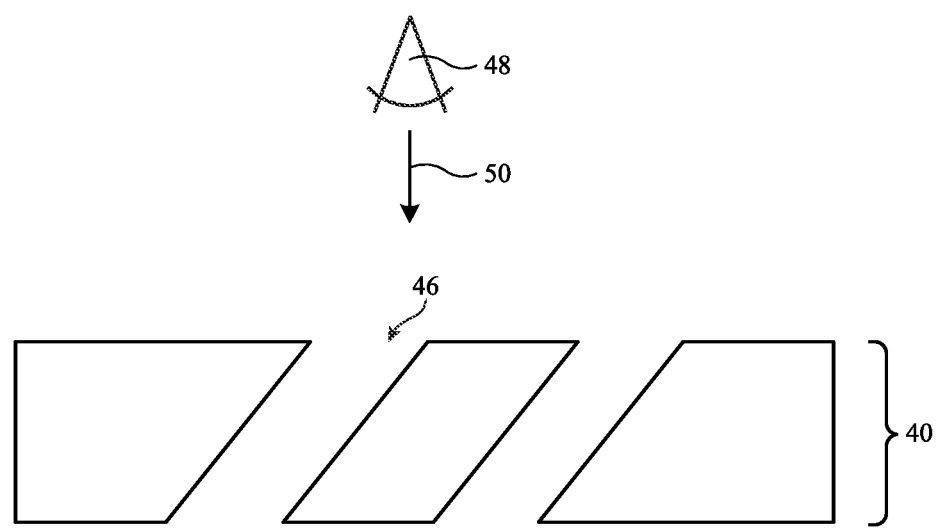
FIG. 11 is a cross-sectional side view of an illustrative layer with openings that are angled at a non-zero angle with respect to a surface normal for the layer to help hide the openings in accordance with an embodiment.

Another way that openings 46 may be visually obscured is by creating some or all of openings 46 using angled holes of the type shown in FIG. 11. As shown in the cross-sectional side view of layer 40 of FIG. 11, openings 46 may, as an example, be oriented at a non-zero angle (e.g., an angle of 45°, 20-70°, or other suitable non-zero angle) with respect to the surface normal of layer 40, thereby making holes 40 less visible when viewed by viewer 48 in an on-axis direction such as direction 50.

Figure 12:
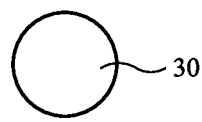
FIGS. 12 and 13 are cross-sectional views of illustrative strands of material in accordance with an embodiment.
Figure 13:
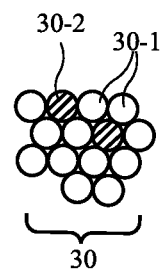

Any suitable strands of material (e.g., monofilaments, multifilament yarn, etc.) may be used in forming fabric for layer 40 (e.g., upper layer 40-1). FIG. 12 is a cross-sectional side view of an illustrative strand of material for forming a fabric layer for layer 40. In the example of FIG. 12, strand 30 is a monofilament. Multi-filament strands may also be used. Multi-filament strands contain multiple strands each of which may be a monofilament or a multi-filament strand. Multi-filament strands may contain strands of a single type or of more than one type. As shown in FIG. 13, strand 30 may include strands 30-1 of a first type (e.g., polymer monofilaments such as monofilaments of nylon, polyester, polyethylene, cellulose triacetate, or polyethylene terephthalate) and strands 30-2 of a second type (e.g., multifilament yarn of cotton or other natural material having a different appearance than the strands of the first type to help create a surface pattern that visually hides openings 46).

Figure 14:
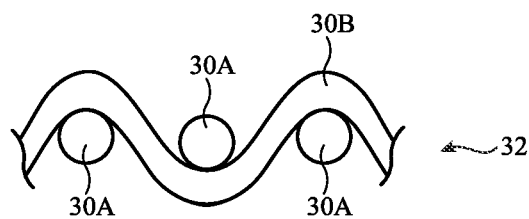
FIG. 14 is a cross-sectional side view of illustrative fabric of the type that may be formed from strands of material such as the strands of FIG. 12 and/or FIG. 13 in accordance with an embodiment.

FIG. 14 is a cross-sectional side view of an illustrative fabric layer of the type that may be used in forming some or all of layer 40 (e.g., fabric for forming layer 40-1). As shown in FIG. 14, fabric 32 may be woven fabric having warp strands 30A and weft strands 30B. Any type of weave may be used in forming fabric 32. For example, fabric 32 may have a plain weave, a twill weave (where one or more warp strands alternately pass over and under two or more weft strands) to provide a diagonal pattern on the face of fabric 32, or other types of weave. If desired, fabric 32 may include knit fabric, braided fabric, felt, and/or other types of interlaced (intertwined) strands of material. Configurations in which layer 40-1 is woven fabric may sometimes be described herein as an example.

Any suitable technique may be used in forming openings 46 in layer 40 (e.g., drilling, punching, cutting, etc.). In an illustrative configuration, laser drilling techniques are used (e.g., using a carbon dioxide laser producing infrared light or other suitable laser source). During laser drilling, meltable material such as polymer material may melt and resolidify, thereby effectively cauterizing the edges of the cut fabric and helping to suppress fraying of the fabric. In forming openings 46 of the type shown in FIG. 7, laser drilling may be performed through a tool having an array of openings sufficiently large to pass laser beams that form openings 46-2 in layer 40-2. After forming openings 46-2 in layer 40-2 and removing any debris produced (e.g., under vacuum pressure) openings 46-1 may be laser drilled through layer 40-1.

Figure 15:
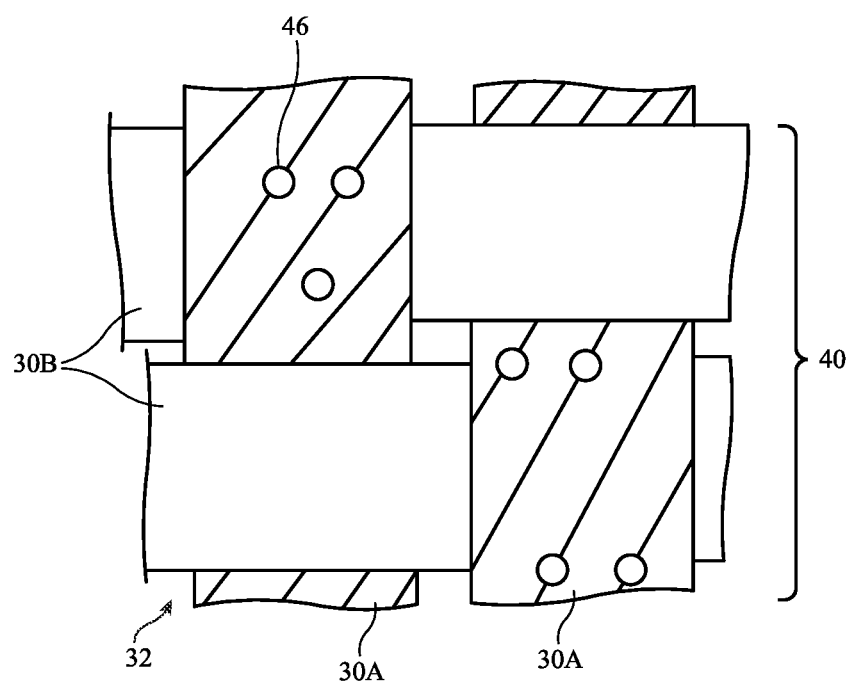
FIG. 15 is a top view of an illustrative layer of fabric having openings in accordance with an embodiment.

Using machine vision and a computer-controlled beam steerer, the laser beam used in a laser drilling tool may be used to selectively form holes through some parts of layer 40 and not others. For example, in scenarios in which openings 46 appear dark, it may be desirable to form openings 46 areas of the surface of layer 40 that have darker appearances (whether due to the material used to form those areas, surface texture variations, printed coatings, etc.). This type of arrangement is shown in the top view of layer 40 of FIG. 15. In the example of FIG. 15, the outer surface of layer 40 is covered with fabric 32. The fabric has warp strands 30A and weft strands 30B with different appearances. Warp strands 30A may be, for example, darker in appearance than weft strands 30B. To help hide openings 46 from view in an arrangement such as this in which strands 30B are darker than strands 30A, most or all of openings 46 may be laser drilled in darker strands 30B.

Figure 16:
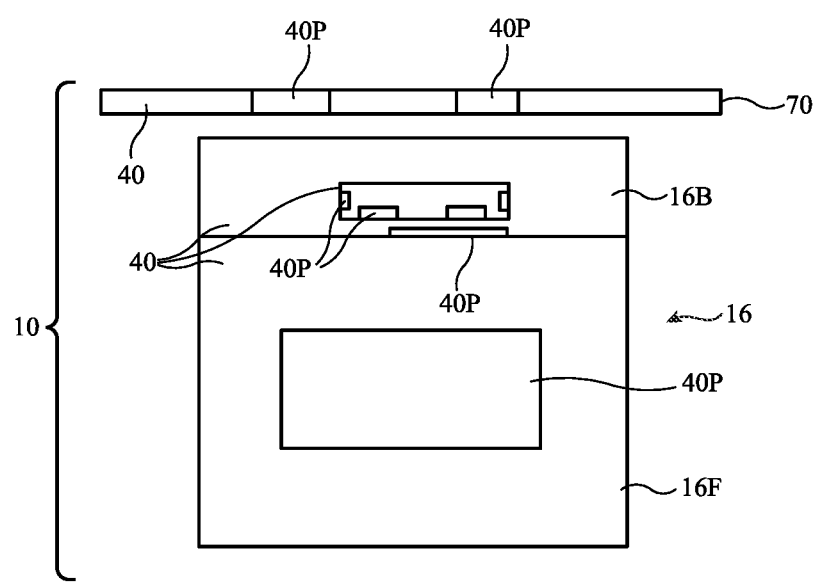
FIG. 16 is a top view of an illustrative system showing illustrative locations for ports formed from arrays of openings in accordance with embodiments.

FIG. 16 shows how layers 40 with areas 40P containing openings 46 may be formed in structures in system 10. Layers 40 may, as an example, be used in forming a covering layer for seat 16 such as a layer in seat cushion 16F, backrest 16B, and/or headrest 16HR. Areas 40P may be formed on a front portion of headrest 16HR that faces forward (towards seat cushion 16F) to provide left and right audio channels for midrange and/or base frequencies and areas 40P may be formed on opposing left and right side portions of headrest 16HR (e.g., surfaces that are perpendicular to the front portion) to provide left and right audio channels for high-frequency drivers (e.g., tweeters). Areas 40P in cushion 16F and backrest 16B may overlap components for heating, cooling, and/or ventilation. Areas 40P on layer 40 in structure 70 (e.g., a dashboard, door portion, footwell, etc.) may overlap light-emitting components, as described in connection with the examples of FIGS. 5 and 6 (as an example).

The foregoing is merely illustrative and various modifications can be made to the described embodiments. The foregoing embodiments may be implemented individually or in any combination.

What is claimed is:

1. An electronic device, comprising:
   an audio component;
   a first layer with first openings, wherein the first openings have a first size; and
   a second layer interposed between the first layer and the audio component, wherein the second layer comprises second openings that are overlapped by at least some of the first openings, and wherein the second openings have a second size that is larger than the first size.

2. The electronic device of claim 1, wherein a first set of the first openings overlap the audio component and a second set of the first openings do not overlap the audio component.

3. The electronic device of claim 2, wherein the first layer is a fabric layer and the second layer is a foam layer.

4. The electronic device of claim 3, wherein the fabric layer has first and second strands with different appearances, and wherein more of the first set of the first openings pass through the first strands than pass through the second strands.

5. The electronic device of claim 2, wherein the second set of the first openings has a density that decreases as a function of increasing distance from the first set of the first openings.

6. The electronic device of claim 1, wherein the first size is less than 0.5 mm in diameter, and the second size is at least 1.5 mm in diameter.

7. The electronic device of claim 6, wherein the first openings are invisible to an unaided eye.

8. The electronic device of claim 7, wherein the first layer comprises an outer surface with first and second areas of different appearances configured to visually hide the first openings.

9. The electronic device of claim 1, wherein the audio component comprises a speaker configured to emit sound through the first and second openings.

10. The electronic device of claim 9, further comprising:
a fan configured to move air through the first and second openings.

11. The electronic device of claim 9, further comprising:
a light emitter configured to emit light through the first and second openings.

12. The electronic device of claim 1, wherein the first layer comprises fabric, and the first openings comprise laser-drilled openings with edges that include melted portions of the fabric.

13. An electronic device, comprising:
a fabric layer comprising openings, wherein the openings comprise invisible laser-drilled openings that have edges that include melted portions of the fabric layer; and
a light emitter configured to emit light through the openings.

14. The electronic device of claim 13, wherein the openings extend entirely through the fabric layer.

15. The electronic device of claim 13, wherein the openings extend partially through the fabric layer.

16. The electronic device of claim 13, further comprising:
a speaker configured to emit sound through the openings.

17. The electronic device of claim 13, wherein the openings have diameters of less than 0.5 mm.

18. An electronic device, comprising:
a fabric layer comprising openings, wherein the fabric layer comprises first areas and second areas adjacent to the openings, the first areas have a first texture, and the second areas have a second texture that is different from the first texture; and
a speaker configured to emit sound through the openings in the fabric layer.

19. The electronic device of claim 18, wherein the first and second areas form a pattern on an outer surface of the fabric layer that is configured to make the openings invisible to an unaided eye.

20. The electronic device of claim 18, further comprising:
a light emitter configured to emit light through the openings in the fabric layer.

* * * * *